United States Patent [19]

Hof et al.

[11] Patent Number: 4,963,728
[45] Date of Patent: Oct. 16, 1990

[54] COORDINATE MEASURING APPARATUS HAVING AN OPTICAL SENSING HEAD

[75] Inventors: Albrecht Hof; Wilhelm Ulrich; Lothar Rübl; Klaus-Peter Koch, all of Aalen, Fed. Rep. of Germany

[73] Assignee: Carl-Zeiss-Stiftung, Heidenheim/Brenz, Fed. Rep. of Germany

[21] Appl. No.: 417,551

[22] Filed: Oct. 5, 1989

[30] Foreign Application Priority Data

Oct. 7, 1988 [DE] Fed. Rep. of Germany ....... 3834117

[51] Int. Cl.$^5$ .............................................. H01J 5/16
[52] U.S. Cl. ................................ 250/227.11; 250/561; 250/227.24; 350/96.21
[58] Field of Search ...................... 250/227.11, 227.20, 250/227.24, 227.26, 561; 350/96.21

[56] References Cited

U.S. PATENT DOCUMENTS

| | | | |
|---|---|---|---|
| 4,356,392 | 10/1982 | Wittekock et al. | 250/561 |
| 4,561,776 | 12/1985 | Pryor. | |
| 4,570,065 | 2/1986 | Pryor | 250/227.11 |
| 4,688,184 | 8/1987 | Taniguti et al. | |
| 4,706,168 | 11/1987 | Weisner. | |
| 4,750,835 | 6/1988 | McMurtry | 250/27.11 |
| 4,887,883 | 12/1989 | Darbut et al. | 350/96.21 |

FOREIGN PATENT DOCUMENTS 0070141 1/1983 European Pat. Off. .
8701798 3/1987 United Kingdom .

OTHER PUBLICATIONS

"Modulare Tastkopffamilie", Werkstatt und Betrieb, vol. 121, No. 4, Apr. 1988, p. 330.

Primary Examiner—David C. Nelms
Assistant Examiner—Khaled Shami
Attorney, Agent, or Firm—Walter Ottesen

[57] ABSTRACT

The invention is directed to a coordinate measuring apparatus having an optical sensing head. The optical sensing head is held on the measuring arm of the coordinate measuring apparatus. The optical sensing head includes a holder and a plurality of detachable front optic units which can be exchanged as required. Each of the front optic units has its own objective and its own illuminating optic arrangement adapted to the objective. The illuminating optic is supplied via light conductors with the light conductors being guided over a change interface where the front optic unit is attached to the holder of the sensing head in a reproducible manner. The light conducting ends for the illumination are coupled in the change interface by means of a coupling device which achieves this coupling with low losses. This device includes, for example, self-centering sleeves which enable flexible supply light conductors to be centrally seated on the end faces of half-rigid plastic light conductors. Interface losses are avoided in this manner.

12 Claims, 6 Drawing Sheets

COORDINATE MEASURING APPARATUS HAVING AN OPTICAL SENSING HEAD

FIELD OF THE INVENTION

The invention relates to a coordinate measuring apparatus having an optical sensing head attached to the measuring arm of the apparatus.

BACKGROUND OF THE INVENTION

It is already known to utilize optical sensing heads on coordinate measuring apparatus in lieu of the mechanical sensing head which is conventionally used and with which the workpiece to be measured must be contacted. It is also known to use the optical sensing heads in addition to this mechanical sensing head. The optical sensing heads permit a contactless detection of the geometric elements to be measured. For this purpose, optical sensing heads which make point measurements are used which, as a rule, function according to the so-called triangulation principle. Also, so-called video sensors can be used from which a more or less complete image of the geometric element to be measured is recorded and later evaluated with known means of image analysis.

The illumination of the object details to be measured presents special problems in video sensing systems of the last-mentioned type. This condition is present because the angle at which the illuminating device radiates must be adapted to the focal length of the objective used to obtain a reflection-free illumination rich in contrast especially for smooth or metallic workpiece surfaces. This is often only obtainable with great effort. Furthermore, heat losses arise with most of the light sources used which can lead to an undesired deformation of the machine coordinate system.

It has already been suggested to utilize fiber optic ring illumination in combination with video sensors in coordinate measuring apparatus in order to avoid the above-mentioned problem. For example, U.S. Pat. No. 4,706,168 discloses a coordinate measuring apparatus having such a video sensor. However, here the supply for the ring illumination is provided via flexible light conductors from a stationary light source. A complicated adjusting mechanism is necessary for adapting the illumination angle to the focal length of the objective used. It is not possible to adjust the video sensor in different viewing directions.

It has also already been suggested to attach optical sensing heads such as triangulation sensors or video sensors via a so-called rotational-pivot joint on the measuring arm of a coordinate measuring apparatus in order to realize different viewing directions. Such a sensing system is described, for example, in U.S. Pat. No. 4,688,184. However, this known sensing system is very expensive because a rotational-pivot joint which can position a video sensor with its relatively high mass with great precision requires a very complex structure and a complex manufacturing procedure.

International patent application No. WO 87/01798 discloses a sensor change device which makes it possible to exchange mechanical sensing heads for optical sensing heads. However, this patent application provides no suggestion with respect to a configuration of an illuminating device for optical sensors.

SUMMARY OF THE INVENTION

It is an object of the invention to provide a coordinate measuring apparatus having an optical sensing head attached to the measuring arm which can be adapted simply and quickly to different measuring tasks which, for example, require different work distances, diameters or viewing directions of the sensing system. It is another object of the invention to provide such a coordinate measuring apparatus wherein the illumination device for the measuring task is always optimally adapted.

The coordinate measuring apparatus of the invention is for making measurements on an object. The coordinate measuring apparatus includes: a measuring arm; an optical sensing head attached to the measuring arm; the sensing head including a holder and a detachable front optic unit conjointly defining a change interface whereat the front optic unit is attached to the holder; the change interface including registration means for assuring that the detachable front optic unit can be reproducibly reattached to the holder; a first set of light conductors arranged in the holder for conducting illuminating light; a second set of light conductors arranged in the front optic unit for receiving the illuminating light conducted by the first set of light conductors; light conductor coupling means disposed at the change interface for providing a low-loss coupling of the light conductors of the first set to corresponding ones of the light conductors of the second set; an objective mounted in the front optic unit for receiving an image from the object; and, illuminating optic means adapted to the objective and optically connected to the second set of light conductors for receiving the light conducted therethrough to illuminate the object.

Thus, with the coordinate measuring apparatus of the invention, it is possible to simply and rapidly automatically exchange the front optic unit of optical sensing heads as well as sensing pins of mechanical sensing heads without recalibration with the illumination being changed at the same time and always being adapted to the objective utilized The change operation can be automated notwithstanding the use of light conductors for illumination since the light conductors are guided across the partition interface between the front optic unit and the remaining portion of the sensing head.

The illuminating device of the sensing head can therefore be supplied by a light source attached at the other end of the measuring arm so as to be thermally insulated without the light conducting cables constituting a disturbance in the measuring region of the coordinate measuring apparatus.

It is advantageous to provide several front optic units having objectives with different working distances, different diameters or different viewing directions. This enables many different measuring tasks to be performed. Different viewing directions can be obtained in that a rotatable holder is provided for the front optic units which is continuously rotatable or rotatable in predetermined steps.

It is also advantageous if the sensing head is journalled in the measuring arm of the coordinate measuring apparatus by means of a yieldable kink joint. The kink joint operates to protect against collision and prevents the sensing head from becoming destroyed as a consequence of a collision with, for example, the workpiece to be measured.

The illuminating optics of the sensing head can contain several collimators arranged about the objective of the sensing head. The collimators radiate at the angle to the optical axis of the objective which is required for a dark-field illumination. In this manner, steps on the surface of metal can be easily detected It is especially advantageous if each of the collimators is supplied by its own light conductor and when the light conductors are individually switchable. In this way, a preferred direction can be set for the illumination at which specific surface structures are more clearly visible or can be imaged with greater contrast Light losses at the partition interface of the light conductors in the vicinity of the changing surface for the front optic units can be held as low as possible by receiving the ends of the light conductors at the partition interface in centering sleeves. The same purpose is fulfilled by using light conductor rods having a full cross section for the light conductors contained in the front optic unit itself. In this way, interface losses are avoided which would otherwise occur when two light conductors containing a plurality of individual fibers are positioned so that their respective end faces mutually abut.

BRIEF DESCRIPTION OF THE DRAWINGS

The invention will now be described with reference to the drawings wherein:

FIG. 5b is a section view taken through light conductor 9a along line Vb—Vb in FIG. 5a;

FIG. 5c is a section view taken through light conductor 13a along line Vc—Vc in FIG. 5a;

DESCRIPTION OF THE PREFERRED EMBODIMENTS OF THE INVENTION

Figure 1:
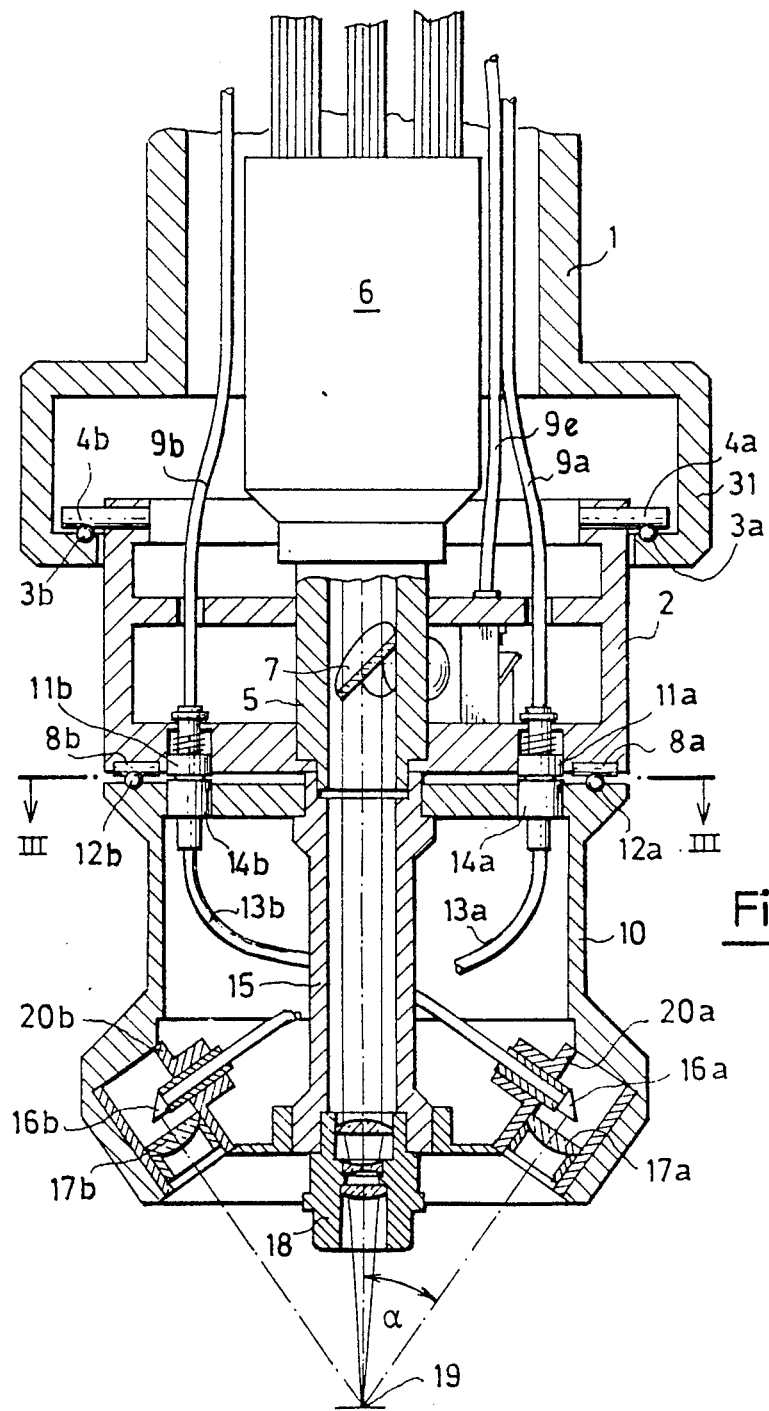
FIG. 1 is an elevation view, partially in section, of an optical sensing head mounted on the measuring arm of a coordinate measuring apparatus.

In FIG. 1, reference numeral 1 identifies the lower end of a vertical measuring arm of a coordinate measuring apparatus. The rectangular cross section of the measuring arm 1 opens into an annular collar 31 having a larger diameter. In its interior, the collar 31 supports three ball bearing pairs at an angular spacing of 120°. An intermediate piece 2 is supported on the three ball bearing pairs via respective radially extending cylinders (4a, 4b, 4c). In FIG. 1, only the two bearings (3a, 3b) of the three bearing pairs are shown. The three-point bearing support conjointly defined by the three cylinders (4a to 4c) and the three ball bearing pairs protects against collision.

Figure 9:
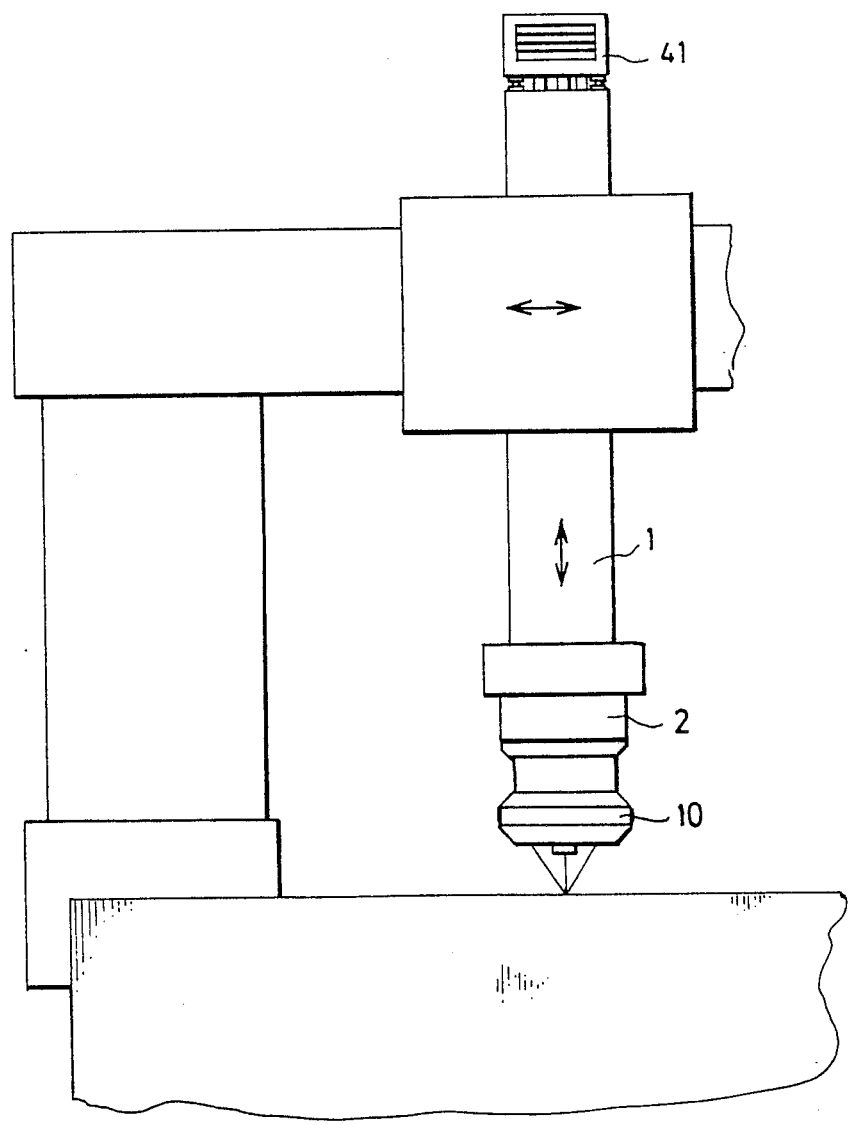

A tube 5 is attached centrally in the intermediate piece 2 and a video camera 6 is mounted on this tube 5. This video camera 6 is the sensor of the optical sensing head comprising the housing parts 2 and 10. The connecting cables of the video camera 6 are guided through the interior of the hollow measuring arm 1. Five light conductors (9a to 9e) are likewise guided through the measuring arm and three of these light conductors are shown in FIG. 1, namely, light conductors (9a, 9b and 9e). The light conductors are made of flexible fiber cables and are supplied by a light source 41 as shown in FIG. 9. The light source 41 is mounted at the upper end of the measuring arm 1 so as to be thermally insulated.

Figure 2:
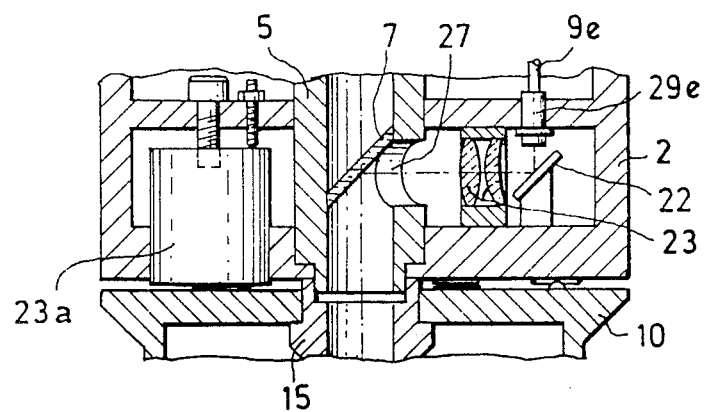
FIG. 2 is a section view taken through the holder in FIG. 1 in another plane.
Figure 3:
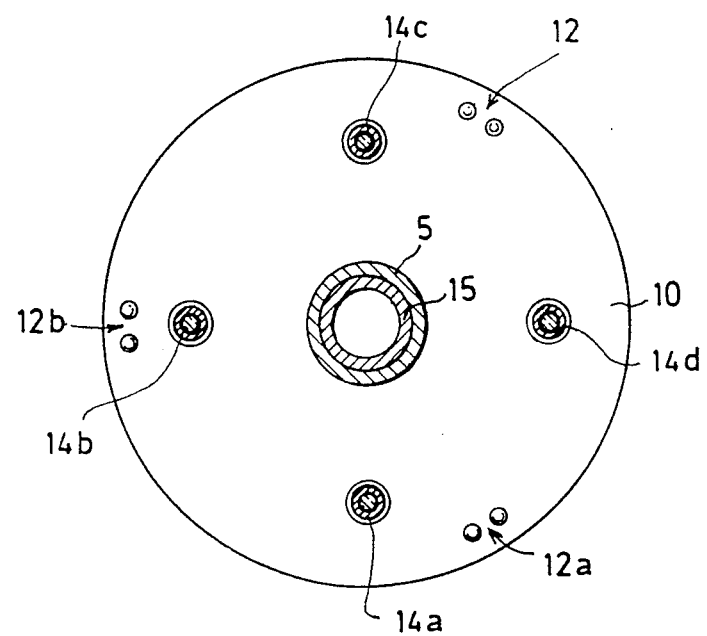
FIG. 3 is a section view taken through the front optic unit of the sensing head of FIG. 1 along line III—III.

The light conductor 9e terminates in a holding sleeve 29e in intermediate piece 2 as shown in FIG. 2. The light exiting from light conductor 9e is deflected at mirror 22 and guided via a collector 23 and is mirrored into the viewing beam path by a divider mirror 7 in the tube 5. This light serves to provide a bright-field illumination of the objects to be measured.

The four other light conductors (9a to 9d) terminate in resiliently biased centering sleeves (11a to 11d) at the lower end of the intermediate piece 2. The lower end of the intermediate piece 2 furthermore defines the change surface for the front optic unit described below and held at the change surface so as to be exchangeable.

The exchangeable front optic unit, which is mounted on the intermediate piece 2 as shown in FIG. 1, carries three ball bearing pairs (12a to 12c) at the upper end of its housing. The three ball bearing pairs (12a to 12c) effect a defined bearing support of the housing 10 on the three cylinders (8a, 8b and 8c) which are firmly seated in the lower end of the intermediate piece 2.

A second tube 15 is held in the interior of housing 10 and is an extension of the tube 5 in the intermediate piece 2. At its lower end, the second tube 15 carries the objective 18 of the front optic unit. Four fittings (20a to 20d) for four collimator lenses (17a to 17d) are firmly seated about the objective 18 at angular spacings of 90°. The collimators are so aligned that their respective axes intersect the optical axis of the objective 18 in the objective plane 19 at an angle α selected for the dark-field illumination.

Figure 5A:
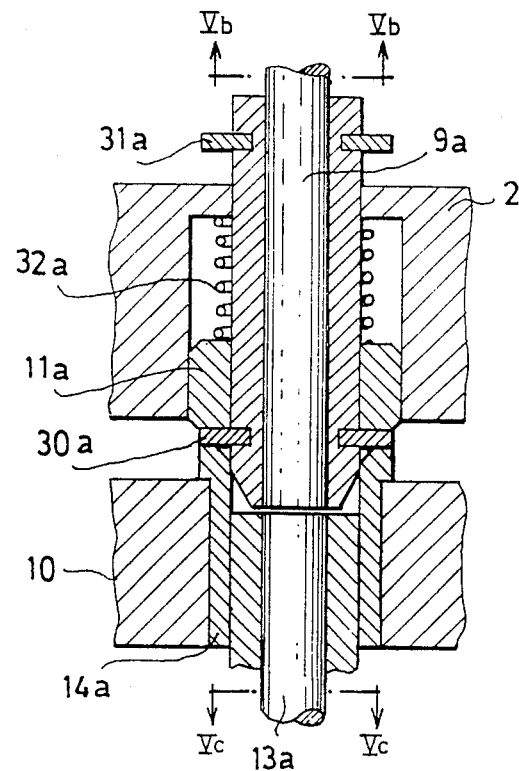
FIG. 5a is an enlarged section view of the light conductor in the sensing head of FIG. 1 in the region of the change surface.

The collimators (17a to 17d) illuminate the object to be measured with the light that exits from the end faces of the four light conductors (13a to 13d). Prisms (16a to 16d) are seated on respective ones of the end faces of the light conductors to deflect the radiation. The light conductors (13a to 13d) are half-rigid plastic rods whose other ends open into respective fittings (14a to 14d) at the upper end of the housing 10. As shown in the enlarged schematic of FIG. 5a, these fittings (14a to 14d) are slightly chamfered at their interior so that the conical outer surfaces of corresponding centering sleeves (11a to 11d) can be reliably accommodated with each change operation. The flexible light conductors (9a to 9d) are received in corresponding ones of the centering sleeves (11a to 11d) where they terminate as shown in FIG. 5a. A spring 32a and two abutment rings (31a and 30a) conjointly act to provide a reliable coupling for each change in the light conductor coupling shown in FIG. 5a.

Figures 5B, 5C:

The core of the half-rigid light-conducting rod 13a in housing 10 is made of solid material as shown in the section view of FIG. 5c. In this way, the condition is obtained that the radiation exiting from the flexible light conductor 9a (see FIG. 5b) on the supply side enters the light conductor 13a without loss. Accordingly, no interface losses occur. The flexible light comprises individual fibers as shown in FIG. 5b.

The holding force by means of which the housing 10 of the changeable front optic unit is pulled into the three-point bearing (12/8) at the lower end of the intermediate piece 2 is generated by the three electromagnets in the intermediate piece 2. In FIG. 2, one of the magnets, namely, the magnet 23a is shown.

The front optic unit shown in FIG. 1 is mounted on the coordinate measuring apparatus shown in FIG. 9. The viewing direction of the front optic unit is directed perpendicularly downwardly onto the surface of the measuring table. In order to perform measuring tasks wherein the surface of the workpiece requires other viewing directions, several front optic units are provided wherein the objective is angled at different angles referred to the disposition of the three-point bearing at the lower end of the intermediate piece 2 perpendicular to the optical axis of the video camera 6. One such front optic unit is shown in FIG. 4.

Figure 4:
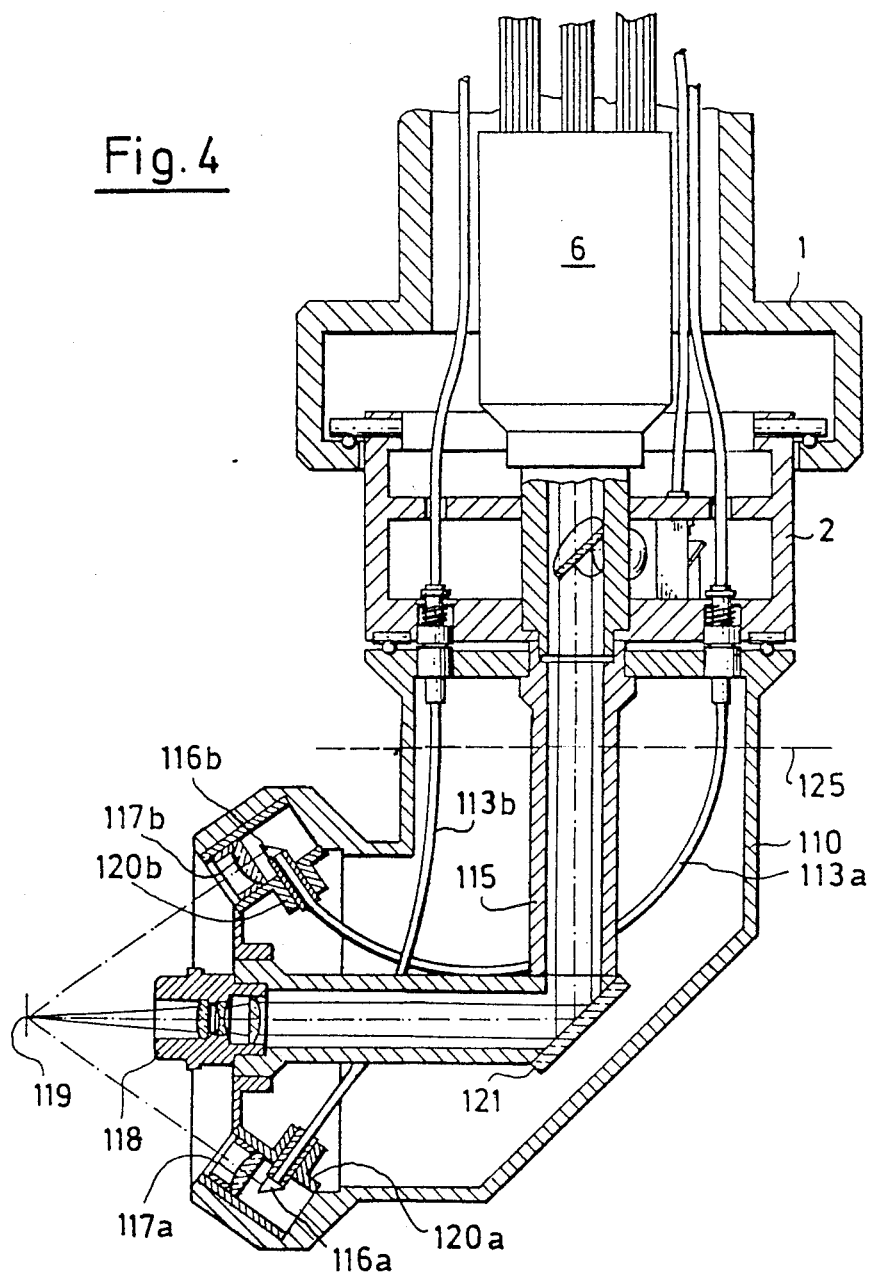
FIG. 4 is a side elevation view, partially in section, of the sensing head of FIG. 1 equipped with a front optic unit for providing an angled viewing direction.

Referring to FIG. 4, a deflection mirror 121 is disposed in the beam path between the objective 118 and the video camera 6 for deflecting the viewing beam. The remaining components are likewise or similarly configured as the front optic unit shown in FIG. 1. By utilizing the 90° symmetry with which the end faces of the light conductors lie one next to the other at the partition interface, one and the same front optic unit 110 can operate in four different directions, namely, in the directions (X, −X, Y and −Y) if additional cylinders are provided at 30° spacings for the three-point bearing at the lower end of the intermediate piece 2.

If flexible light conductors are utilized instead of the half-rigid light conductor rods (113a to 113d) in the housing 110 of the front optic unit and the resulting interface losses are accepted, then different viewing directions can be realized in that a rotational bearing can be utilized at the location identified by the dotted line 125 around which the lower part of the front optic unit 110 is rotatable in a limited angular range.

Figure 8:
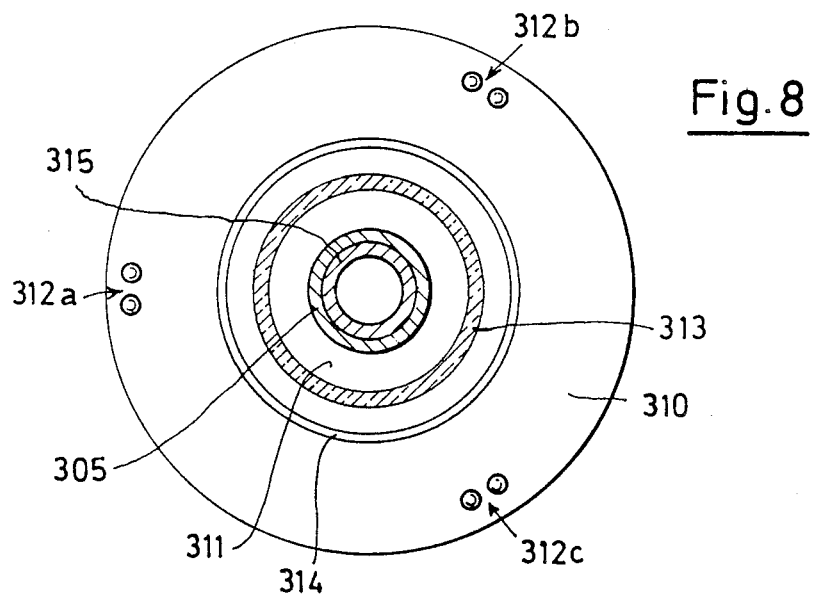
FIG. 8 is a plan view of the change surface of a sensing head according to a further embodiment of the invention; and, FIG. 9 is a simplified schematic of a coordinate measuring apparatus equipped with the sensing head shown in FIG. 1.

A continuous rotation without limit of the rotational angle is possible if the change location is configured as shown in FIG. 8. In FIG. 8, the upper end of the housing of the front optic unit comprises two parts rotatable in directions opposite to each other. The outer ring 310 supports the three-point bearing support identified by reference numerals (312a to 312c). The front optic unit is attached as an entity at the inner ring 311. The rotatable bearing support is indicated by the double line 314.

The fanned-out ends of a fiber-optical light conductor 313 are arranged in a circular configuration in the inner ring 311 and lie with their end faces opposite corresponding ends of one or more supply light conductors which are likewise arranged in a circular configuration. In this way, an optical slip ring is provided which assures the transmission of the light from the supply light conductors into the front optic unit at every angular position. Individual segments of the circle formed by the light conductor end faces can be separately switched on the supply side and/or on the side of the front optic unit in order to adjust for preferred directions of the illumination. On the other hand, individual segments of the circle formed by the light conductor end faces can be separately displaced on the supply side and/or on the side of the front optic unit in order to adjust for preferred directions of the illumination.

Figure 6:
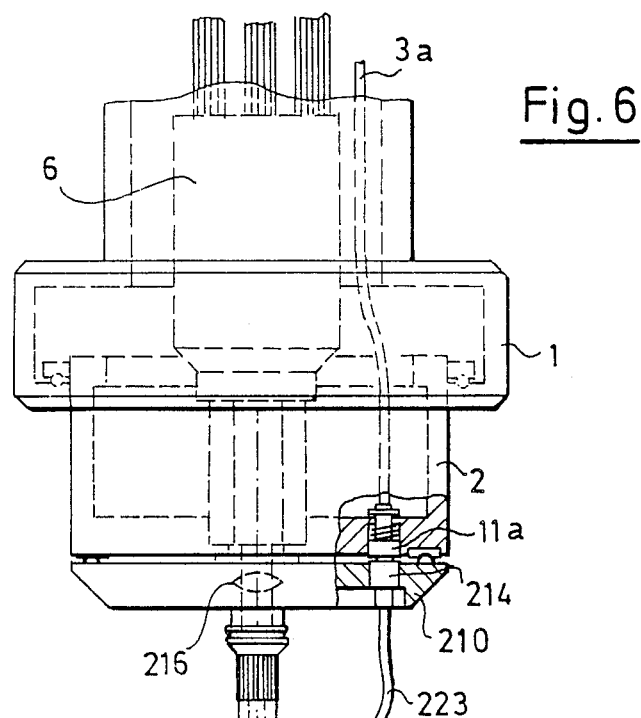
FIG. 6 is a side elevation view of another embodiment of an optical sensing head according to the invention which is mounted on the measuring arm of a coordinate measuring apparatus.

A further embodiment of the invention is shown in FIG. 6 which is especially suitable for video-technical measurements in the interior of bores or other tight workpiece openings. For this purpose, a front optic unit 215 in the form of an endoscope or technoscope is mounted on the intermediate piece 2 of FIG. 1 in lieu of the front optic unit 10 shown there. The technoscope 215 is centrally attached to a holding plate 210 which carries a three-point bearing comprising three ball bearing pairs at its upper end in the same manner as the front optic unit 10 of FIG. 1.

The tube in the plate 210 connects the endoscope 215 with the inner tube in the intermediate piece 2. An auxiliary lens unit 216 is accommodated in the tube in the plate 210 and images the image developed by the objective 218 at the distal end of the endoscope onto the photo-sensitive surface of the television camera 6.

The light-conductor connection 223 of the endoscope 215 is applied to a sleeve 214 on the upper side of the plate 210. This sleeve 214 coacts with the centering sleeve 11a in the intermediate piece 2 in the same manner as the sleeve 14a in the embodiment of FIG. 1 and couples the light conductor 223 to the supply light conductor 3a with low losses.

Figure 7:
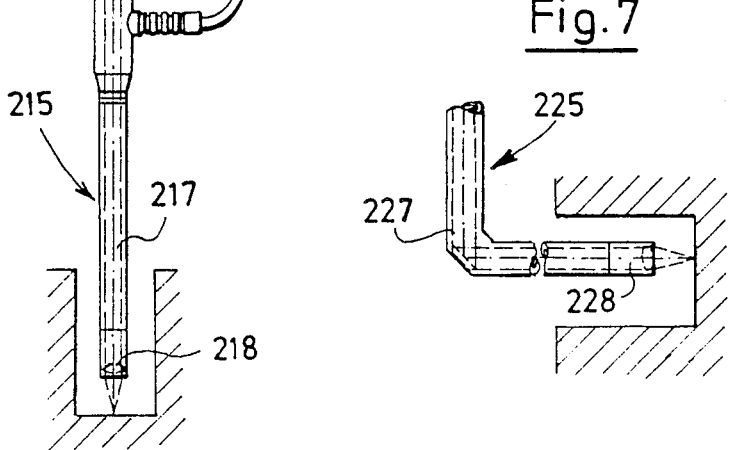
FIG. 7 is a view of an alternate embodiment of a portion of the front optic unit of FIG. 6.

In order that also bores having different axial directions can be measured, further endoscopes are provided on respective ones of other plates 210 which have an angled shaft in lieu of the straight shafts 217. An example of such a shaft 227 is shown in FIG. 7. For a specific measuring task, the necessary number of holding plates 210 with several endoscopes angled in correspondence to the bores to be investigated are held ready and can be exchanged into the part of the sensing head which remains on the measuring arm of the coordinate measuring apparatus in the same manner as mechanical sensing probes and this can be done automatically. Since the objectives of endoscopes or technoscopes are often exchangeable at the distal end, an exchange for objectives having different focal lengths or other viewing directions is also possible in addition to the foregoing.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus for making measurements on an object comprising:

a measuring arm;

an optical sensing head attached to said measuring arm;

said sensing head including a holder and a detachable front optic unit conjointly defining a change interface whereat said front optic unit is attached to said holder;

said change interface including registration means for assuring that said detachable front optic unit can be reproducibly reattached to said holder;

a first set of light conductors arranged in said holder for conducting illuminating light;

a second set of light conductors arranged in said front optic unit for receiving the illuminating light conducted by said first set of light conductors;

light conductor coupling means disposed at said change interface for providing a low-loss coupling of the light conductors of said first set to corresponding ones of the light conductors of said second set;

an objective mounted in said front optic unit for receiving an image from the object; and, illuminating optic means adapted to said objective and optically connected to said second set of light conductors for receiving the light conducted therethrough to illuminate the object.

2. The coordinate measuring apparatus of claim 1, said measuring arm having a first end for mounting said holder and a second end facing away from said holder, the apparatus further comprising light source means for supplying the illuminating light to the light conductors of said first set of light conductors; and, said light source means being mounted on said second end of said measuring arm so as to be thermally insulated therefrom.

3. The coordinate measuring apparatus of claim 1, comprising a plurality of said front optic units, each of said front optic units being attachable to said holder in exchange for another one of said units; a plurality of said objectives configured to provide respectively different work distances, different diameters or different viewing directions; and, said objectives being mounted in corresponding ones of said front optic units.

4. The coordinate measuring apparatus of claim 1, said holder including holding means for permitting a continuous rotation of said front optic unit relative to said holder.

5. The coordinate measuring apparatus of claim 1, said holder including holding means for permitting a stepwise rotation of said front optic unit relative to said holder.

6. The coordinate measuring apparatus of claim 1, said sensing head being held to said measuring arm via a yielding kink joint in said measuring arm.

7. The coordinate measuring apparatus of claim 1, said objective defining an optical axis and said illuminating optic means comprising a plurality of collimators arranged in said front optic unit so as to surround said objective and being adjusted so as to radiate light at an angle to said optical axis required to provide a darkfield illumination of the object.

8. The coordinate measuring apparatus of claim 7, said collimators being optically connected to respective ones of said light conductors of said second set of light conductors.

9. The coordinate measuring apparatus of claim 8, comprising switching means for individually switching said light conductors of said first set of light conductors.

10. The coordinate measuring apparatus of claim 8, said light conductors of said second set of light conductors being respective light conducting rods.

11. The coordinate measuring apparatus of claim 1, said light conductors of said first set of light conductors having respective end portions terminating at said change interface; and, said light conductor coupling means comprising a plurality of centering sleeves for receiving corresponding ones of said end portions of said light conductors of said first set of light conductors.

12. The coordinate measuring apparatus of claim 1, said light conductors of said first set of light conductors terminating in respective end faces defining a first ring at said change interface; and, said light conductors of said second set of light conductors terminating in respective end faces defining a second ring at said change interface directly opposite said first ring.

* * * * *

UNITED STATES PATENT AND TRADEMARK OFFICE
CERTIFICATE OF CORRECTION

PATENT NO. : 4,963,728
DATED : October 16, 1990
INVENTOR(S) : Albrecht Hof, Wilhelm Ulrich, Lothar Rübl and Klaus-Peter Koch It is certified that error appears in the above-identified patent and that said Letters Patent is hereby corrected as shown below:

In column 2, line 41: insert -- . -- between "utilized" and "The".

In column 3, line 4: insert -- . -- between "detected" and "It".

In column 3, line 10: insert -- . -- after "contrast"

In column 4, line 33: delete "The" and substitute -- Registration means, for example, in the form of the -- therefor.

Signed and Sealed this

Seventeenth Day of March, 1992

*Attest:*

HARRY F. MANBECK, JR.

*Attesting Officer*  *Commissioner of Patents and Trademarks*